United States Patent
Shen et al.

(10) Patent No.: US 9,697,416 B2
(45) Date of Patent: *Jul. 4, 2017

(54) OBJECT DETECTION USING CASCADED CONVOLUTIONAL NEURAL NETWORKS

(71) Applicant: Adobe Systems Incorporated, San Jose, CA (US)

(72) Inventors: Xiaohui Shen, San Jose, CA (US); Haoxiang Li, Kearny, NJ (US); Zhe Lin, Fremont, CA (US); Jonathan W. Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,478

(22) Filed: Jun. 29, 2016

(65) Prior Publication Data

US 2016/0307074 A1    Oct. 20, 2016

Related U.S. Application Data

(63) Continuation of application No. 14/550,800, filed on Nov. 21, 2014, now Pat. No. 9,418,319.

(51) Int. Cl.
  *G06K 9/62* (2006.01)
  *G06K 9/00* (2006.01)
  *G06K 9/46* (2006.01)

(52) U.S. Cl.
  CPC ....... *G06K 9/00288* (2013.01); *G06K 9/4628* (2013.01); *G06K 9/6257* (2013.01)

(58) Field of Classification Search
  CPC .............. G06K 9/00288; G06Q 10/063; G06T 15/205; G06T 2207/10088

(Continued)

(56) References Cited

U.S. PATENT DOCUMENTS 6,819,790 B2    11/2004    Suzuki et al.
6,820,897 B2 *  11/2004    Breed ................... B60R 21/015
                                                            280/735

(Continued)

OTHER PUBLICATIONS

"Notice of Allowance", U.S. Appl. No. 14/550,800, Mar. 29, 2016, 8 pages.

(Continued)

*Primary Examiner* — Yosef Kassa
(74) *Attorney, Agent, or Firm* — Wolfe-SBMC

(57) ABSTRACT

Different candidate windows in an image are identified, such as by sliding a rectangular or other geometric shape of different sizes over an image to identify portions of the image (groups of pixels in the image). The candidate windows are analyzed by a set of convolutional neural networks, which are cascaded so that the input of one convolutional neural network layer is based on the input of another convolutional neural network layer. Each convolutional neural network layer drops or rejects one or more candidate windows that the convolutional neural network layer determines does not include an object (e.g., a face). The candidate windows that are identified as including an object (e.g., a face) are analyzed by another one of the convolutional neural network layers. The candidate windows identified by the last of the convolutional neural network layers are the indications of the objects (e.g., faces) in the image.

20 Claims, 12 Drawing Sheets

(58) Field of Classification Search
USPC ....... 382/156, 157, 170, 171, 190, 209, 278; 358/537, 538, 452
See application file for complete search history.

(56) References Cited

U.S. PATENT DOCUMENTS

| | | | |
|---|---|---|---|
| 7,219,085 B2 | 5/2007 | Buck et al. | |
| 7,319,780 B2 * | 1/2008 | Fedorovskaya | G06F 19/321 128/922 |
| 7,346,196 B2 * | 3/2008 | Gin | G06K 9/00221 348/151 |
| 7,603,000 B2 | 10/2009 | Zheng et al. | |
| 7,634,137 B2 | 12/2009 | Simard et al. | |
| 7,813,822 B1 | 10/2010 | Hoffberg | |
| 7,904,187 B2 * | 3/2011 | Hoffberg | G05B 15/02 370/200 |
| 7,987,003 B2 * | 7/2011 | Hoffberg | G05B 15/02 370/200 |
| 8,100,552 B2 * | 1/2012 | Spero | B60Q 1/04 362/227 |
| 8,214,238 B1 * | 7/2012 | Fairfield | G06Q 10/063 705/7.11 |
| 8,346,017 B2 * | 1/2013 | Aguera | G06T 15/205 382/154 |
| 8,441,548 B1 * | 5/2013 | Nechyba | H04N 5/228 348/222.1 |
| 8,463,025 B2 | 6/2013 | Melvin et al. | |
| 9,141,916 B1 | 9/2015 | Corrado et al. | |
| 9,418,319 B2 | 8/2016 | Shen et al. | |
| 9,563,825 B2 | 2/2017 | Shen et al. | |
| 2008/0159589 A1 | 7/2008 | Benyoub | |
| 2014/0279773 A1 | 9/2014 | Chen et al. | |
| 2015/0170001 A1 | 6/2015 | Rabinovich et al. | |
| 2016/0148078 A1 | 5/2016 | Shen et al. | |
| 2016/0148079 A1 | 5/2016 | Shen et al. | |

OTHER PUBLICATIONS

"Supplemental Notice of Allowance", U.S. Appl. No. 14/550,800, May 19, 2016, 6 pages.

Chen,"Joint Cascade Face Detection and Alignment", European Conference on Computer Vision (ECCV), 2014, 2014, 14 pages.

Li,"Efficient Boosted Exemplar-based Face Detection", CVPR 2014, 2014, 8 pages.

Shen,"Detecting and Aligning Faces by Image Retrieval", IEEE Conference on Computer Vision and Pattern Recognition (CVPR), 2013, pp. 4321-4328.

Sun,"Deep Convolutional Network Cascade for Facial Point Detection", In Proceedings of IEEE Conference on Computer Vision and Pattern Recognition (CVPR), 2013., Jun. 2013, pp. 3476-3483.

Zhu,"Face Detection, Pose Estimation, and Landmark Localization in the Wild", 2012 IEEE Conference on Computer Vision and Pattern Recognition, 2012, 8 pages.

"Pre-Interview Communication", U.S. Appl. No. 14/549,350, Aug. 11, 2016, 12 pages.

"Notice of Allowance", U.S. Appl. No. 14/549,350, Sep. 26, 2016, 7 pages.

* cited by examiner

OBJECT DETECTION USING CASCADED CONVOLUTIONAL NEURAL NETWORKS

RELATED APPLICATIONS

This application is a continuation of U.S. patent application Ser. No. 14/550,800, filed Nov. 21, 2014, entitled "Object Detection Using Cascaded Convolutional Neural Networks" to Xiaohui Shen, et al., the disclosure of which is hereby incorporated by reference herein in its entirety.

BACKGROUND

As computing technology has advanced, computers have become increasingly used in many different manners. One such use is digital imaging, including capturing digital images, editing digital images, sharing digital images with friends, and so forth. With digital imaging, situations arise in which a user desires to have a portion of an image where a person's face is located identified by the computer. Although some techniques exist for identification of such portions, these techniques can be time-consuming. Delays in performing the identification can become problematic for users, leading to user frustration with their computers.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, multiple candidate windows in an image are identified, each candidate window including a group of pixels of the image, and the multiple candidate windows including overlapping candidate windows. One or more of the multiple candidate windows that include an object are identified, the identifying including analyzing the multiple candidate windows using cascaded convolutional neural networks. The cascaded convolutional neural networks include multiple cascade layers, each cascade layer comprising a convolutional neural network. The multiple cascade layers include a first cascade layer that analyzes the identified multiple candidate windows, a second cascade layer that analyzes ones of the multiple candidate windows identified by the first cascade layer as including an object, and a third cascade layer that analyzes ones of the multiple candidate windows identified by the second cascade layer as including an object. An indication of one or more of the multiple candidate windows identified by the third cascade layer as including an object is output as an indication of one or more objects in the image.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
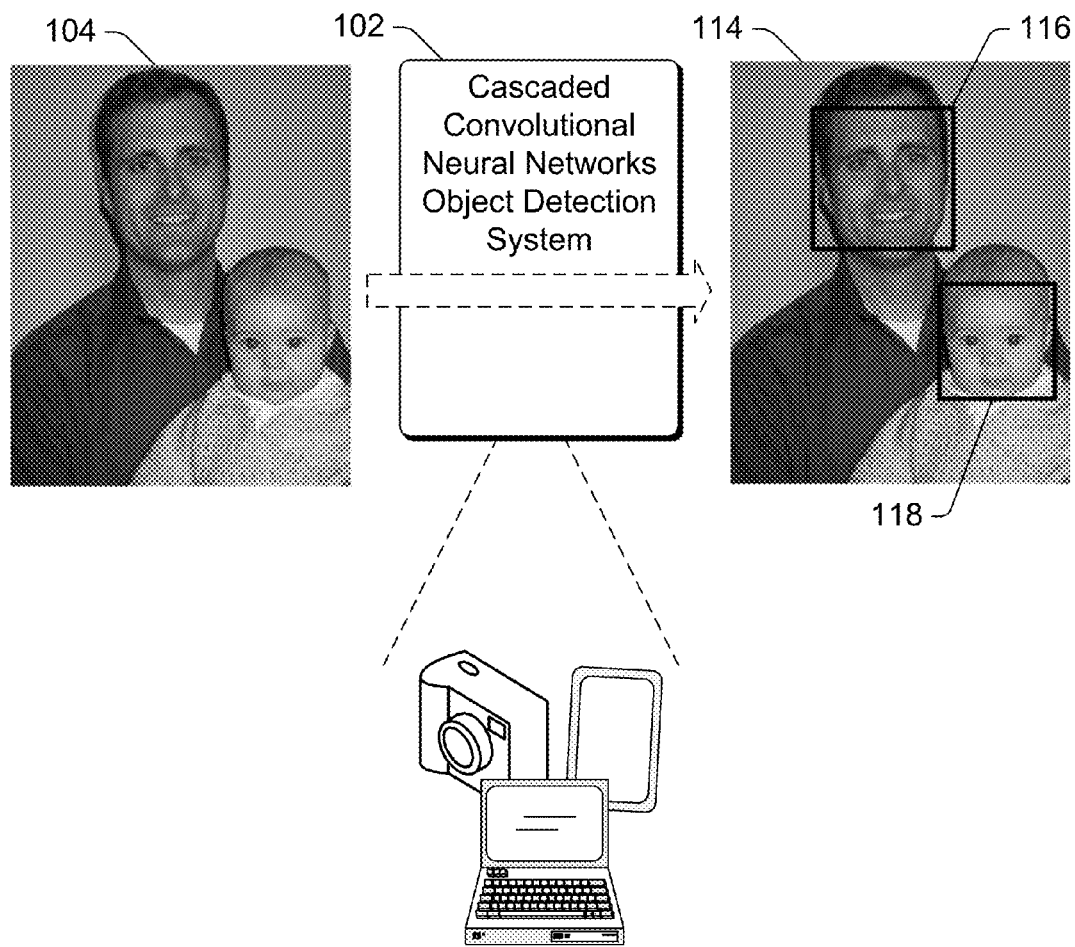
FIG. 1 illustrates an example of object detection using cascaded convolutional neural networks in accordance with one or more embodiments.

Object detection using cascaded convolutional neural networks is discussed herein. A convolutional neural network refers to a neural network that includes multiple layers, each layer including one or more filters that are applied to the input data. The multiple layers include at least a convolution layer, a pooling layer, and a fully-connected layer. The convolution layer performs a convolution, for each of one or more filters in the convolution layer, of the filter over the input data. The pooling layer takes a block from the convolution layer and subsamples the block to produce a single output from the block. The fully-connected layer takes all the neurons in the previous layer in the convolutional neural network and connects them to every neuron in the fully-connected layer.

Different candidate windows in an image are identified, such as by sliding a rectangular or other geometric shape of different sizes over an image to identify portions of the image (groups of pixels in the image). A candidate window refers to a group of pixels included in a geometric shape (e.g., a rectangle) at a particular location of the image. Geometric shapes of different sizes can be used. The geometric shapes are moved to different locations (e.g., substantially all possible locations) over the image, resulting in multiple different candidate windows each including a different group of pixels of the image (although each individual pixel of the image is included in multiple different candidate windows). By identifying substantially all of the possible locations for the geometric shapes, each object (e.g., face) included in the image is included in at least one of the candidate windows. These candidate windows can then be analyzed to determine which include the object.

The candidate windows are analyzed by a set of convolutional neural networks, which are cascaded so that the input of one convolutional neural network layer (also referred to as a cascade layer) can be based on the output of another convolutional neural network layer. A feature of one convolutional neural network layer can also optionally be re-used by another convolutional neural network layer. Each convolutional neural network layer drops or rejects one or more candidate windows that the convolutional neural network layer determines does not include an object (e.g., a face). The candidate windows that are identified as including an object (e.g., a face) are analyzed by another one of the convolutional neural network layers. The candidate windows identified by the last of the convolutional neural network layers are the indications of the objects (e.g., faces) in the image. Thus, rather than having a single, deep convolutional neural network, the cascaded convolutional neural network has multiple layers of convolutional neural networks. Earlier convolutional neural network layers identify candidate windows more quickly but with less accuracy, and later convolutional neural network layers identify candidate windows less quickly but with more accuracy. The earlier convolutional neural network layers are used to quickly reject a large number of candidate windows that are quickly determined to not include an object, and the slower but more accurate convolutional neural network layers identify that are not rejected by the earlier convolutional neural network layers. Speed of the cascaded convolutional neural network is improved by allowing the large number of candidate windows to be quickly rejected by the earlier convolutional neural network layers.

A window alignment neural network can optionally be incorporated into the cascaded convolutional neural networks. The window alignment neural network layer can be situated between any two convolutional neural network layers of the cascaded convolutional neural networks. The window alignment neural network layer re-positions a candidate window to more accurately identify a full object (e.g., a full face) in an image rather than just a portion of an object (e.g. a portion of a face). By more accurately identifying a full object (e.g., a full face) in an image, the confidence that a candidate window identifies an object (e.g. a face), as determined by a cascade layer of the cascaded convolutional neural networks, can be increased, thus increasing the accuracy of the cascaded convolutional neural network. The re-positioning of a candidate window can also result in two candidate windows having the same (or substantially the same) location, allowing one of the candidate windows to be deleted and reducing the number of candidate windows analyzed by (and thus the time taken to analyze the candidate windows) by later layers of the convolutional neural network.

FIG. 1 illustrates an example of object detection using cascaded convolutional neural networks in accordance with one or more embodiments. An object detection system 102 can be implemented by one or more of a variety of different types of devices that can edit or process images, also referred to as an image processing device. For example, the object detection system 102 can be implemented by a desktop computer, a server computer, a laptop or netbook computer, a tablet or notepad computer, a set-top box communicatively coupled to a display device, a television or other display device, a cellular or other wireless phone (e.g., a smart phone), a game console, an automotive computer, a digital camera, a scanner or copier, and so forth. Thus, devices implementing the object detection system 102 may range from full resource devices with substantial memory and processor resources (e.g., personal computers, game consoles) to low-resource devices with limited memory and/or processing resources (e.g., digital cameras, mobile devices).

The object detection system 102 processes images to identify objects in the images. In the discussions herein, the objects being identified are faces. However, it should be noted that faces are only examples of objects that can be identified. Various other types of objects can alternatively be identified, such as vehicles, buildings, types of animals, and so forth. The techniques discussed herein can be analogously applied to detection of these other types of objects (e.g., by training the convolutional neural networks to identify these other objects rather than faces).

As illustrated in the example of FIG. 1, an input image 104 is obtained by the object detection system 102, which identifies faces in the input image 104. An indication of the identified faces can be output by the object detection system 102 in any of a variety of different manners. In the illustrated example, the identified faces are indicated in an output image 114 with rectangular boxes 116 and 118 around the identified faces. Alternatively, the object detection system 102 can output an indication of the identified faces in different manners, such as by providing an indication of the identified faces (e.g., coordinates in the image 104 of the identified faces) to another component or module for processing, by storing an indication of the identified faces (e.g., coordinates in the image 104 of the identified faces) in a data file or as metadata associated with the image 104, and so forth. The object detection system 102 uses cascaded convolutional neural networks to identify the faces, as discussed in more detail below.

Figure 2:
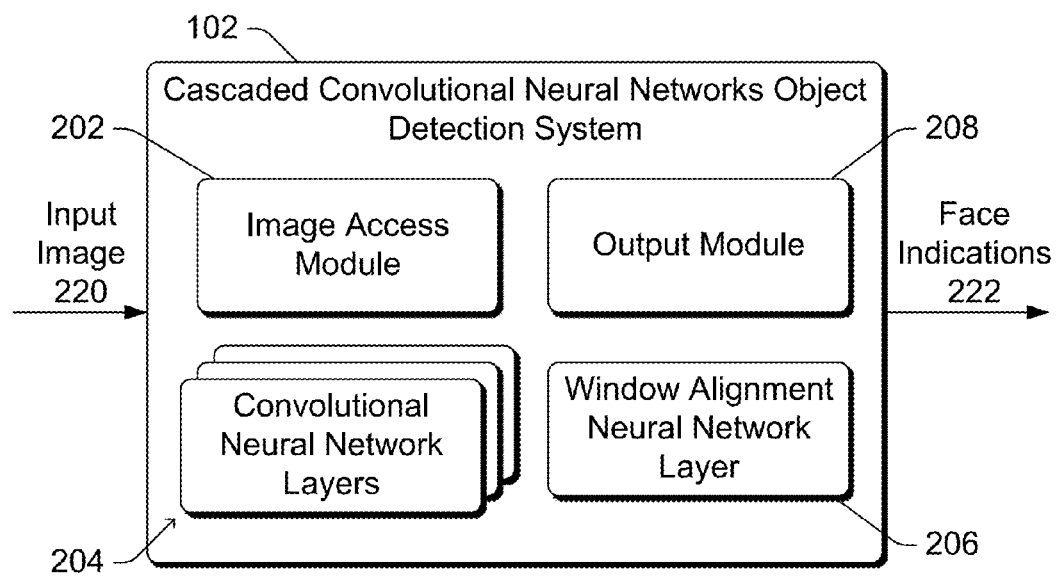
FIG. 2 illustrates an example cascaded convolutional neural networks object detection system in accordance with one or more embodiments.

FIG. 2 illustrates an example cascaded convolutional neural networks object detection system 102 in accordance with one or more embodiments. The cascaded convolutional neural networks system 102 includes an image access module 202, multiple convolutional neural networks 204, a window alignment neural network layer 206, and an output module 210. Although particular functionality is discussed herein with reference to particular modules, it should be noted that the functionality of individual modules discussed herein can be separated into multiple modules, and/or at least some functionality of multiple modules discussed herein can be combined into a single module. Furthermore, it should be noted that in some situations not all of the neural network layers 204 and 206 need be included in the system 102. For example, the system 102 may not support window alignment, and thus may not include the window alignment neural network layer 206.

The image access module 202 obtains an image 220, also referred to as an input image, for face detection. The image access module 202 can obtain the image 220 in various manners and from various sources, and can obtain the image from another component of the device implementing system 102 or from a separate device. For example, the module 202 can obtain the image 220 from an image capture component of the device implementing the system 102, retrieve the image 220 from a storage device coupled to the device implementing the system 102, retrieve the image from a storage device accessed via a network, and so forth.

Generally, the convolutional neural network layers 204 analyze the input image 220 to identify faces in the image 220. Each convolutional neural network layer 204 is a different convolutional neural network, having different parameters, different accuracy, and different computational requirements. The convolutional neural network layers 204 are cascaded, so that the input to a later convolutional neural network layer 204 is based on the output of an earlier convolutional neural network layer 204. Multiple candidate windows in the image 220 that may include a face are identified, and each convolutional neural network layer 204 operates to reject one or more of the candidate windows. The candidate windows that remain after the last convolutional neural network layer 204 are indicated as including a face, as discussed in more detail below.

Generally, the window alignment neural network layer 206 facilitates accurate face identification and operates between two convolutional neural network layers 204. The window alignment neural network layer 206 shifts or transforms candidate windows that identify part of a face by various amounts to better identify a face. The number of these candidate windows can also be reduced, which reduces the number of candidate windows that are analyzed by a subsequent convolutional neural network layer 204.

The convolutional neural network layers 204, and optionally the window alignment neural network 206 operate to identify faces in the input image 220. The output module 208 outputs face indications 222 that indicate theses faces identified in the input image 220. The indication can take various forms as discussed above.

Figure 3:
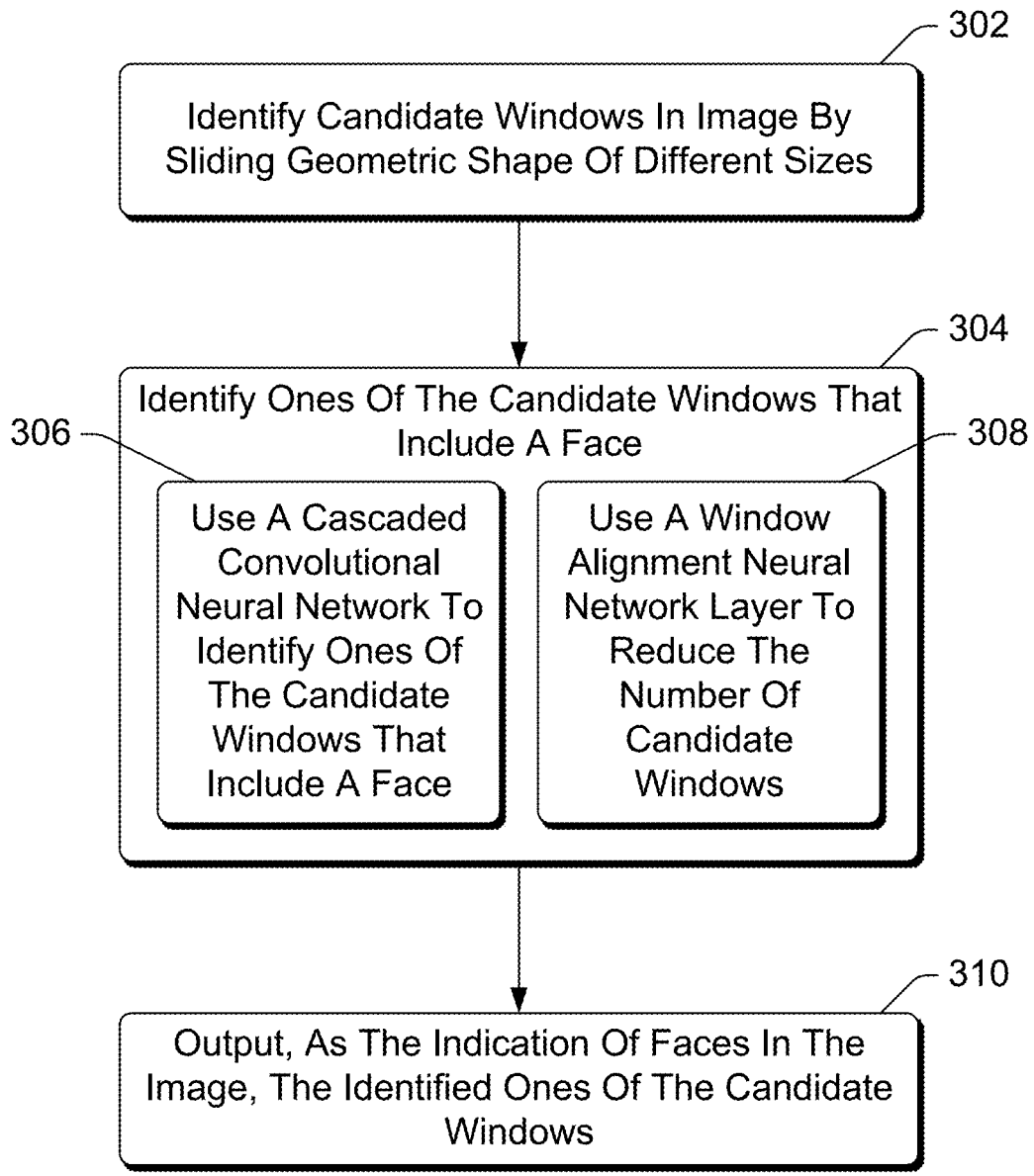
FIG. 3 is a flowchart illustrating an example process for detecting objects using cascaded convolutional neural networks in accordance with one or more embodiments.

FIG. 3 is a flowchart illustrating an example process 300 for detecting objects using cascaded convolutional neural networks in accordance with one or more embodiments. Process 300 is carried out by a cascaded convolutional neural networks object detection system, such as the object detection system 102 of FIG. 1, and can be implemented in software, firmware, hardware, or combinations thereof. Process 300 is shown as a set of acts and is not limited to the order shown for performing the operations of the various acts. Process 300 is an example process for detecting objects using cascaded convolutional neural networks; additional discussions of detecting objects using cascaded convolutional neural networks are included herein with reference to different figures.

In process 300, candidate windows in an image are identified by sliding a geometric shape of different sizes around the image (act 302). In one or more embodiments, the geometric shape is a rectangle, although other geometric shapes can alternatively be used (e.g., circles, ellipses, non-rectangular quadrilaterals, and so forth). This identification in act 302 can be performed in various manners, such as by beginning with a vertex of the geometric shape at a particular pixel (e.g., a pixel in the top left corner of the image), and then sliding the geometric shape to the right and down so that each possible location of the geometric shape in the image is used to identify a candidate window. The group of pixels included in the geometric shape at a particular location are the pixels included in (or identified by) a candidate window generated for that particular location. It will be appreciated that since all of the candidate windows together identify all (or substantially all) possible locations of the geometric shape in the image, each of the candidate windows overlaps multiple other candidate windows. This process can then be repeated for geometric shapes of different sizes (e.g., the process can be performed for a 12×12 pixel window, then a 20×20 pixel window, then a 40×40 pixel window, and so forth), increasing the number of candidate windows that are identified.

Figure 4:
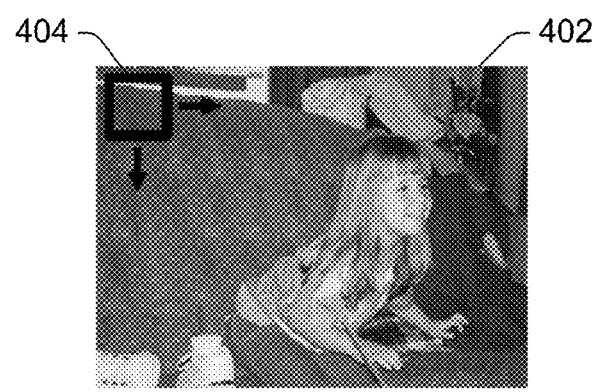
FIG. 4 illustrates an example of identifying candidate windows in an image in accordance with one or more embodiments.

FIG. 4 illustrates an example of identifying candidate windows in an image in accordance with one or more embodiments. An image 402 is illustrated with a rectangular shape 404 in the image 402. The rectangular shape 404 is moved down and to the right (e.g., pixel by pixel) to select different portions or windows of the image 402 that are of the same size as the rectangular shape 404. Each of these different portions or windows of the image 402 overlaps multiple other portions or windows of the image 402. The rectangular shape 404 is then increased (or alternatively decreased) in size and the movement down and to the right repeated to identify additional candidate windows.

Returning to FIG. 3, ones of the candidate windows identified in act 302 that include a face are identified (act 304). The sliding of the geometric shape of different sizes in act 302 can result in numerous (e.g., thousands or tens of thousands) of different candidate windows. As part of the identification in act 304, cascaded convolutional neural networks are used to identify ones of the candidate windows that include a face (act 306). As part of the identification in act 304, a window alignment neural network layer can optionally be used to reduce the number of candidate windows (act 308). It should be noted that the use of the window alignment neural network is optional, and a candidate window that includes a face can be identified in act 304 in the absence of using the window alignment neural network.

An indication of ones of the candidate windows in the image that include a face are output (act 310). The ones of the candidate windows that include a face are the candidate windows identified in act 304. An image can include multiple faces, and thus multiple indications can be output in act 310. The indication can be output in a variety of different manners as discussed above.

Figure 5:
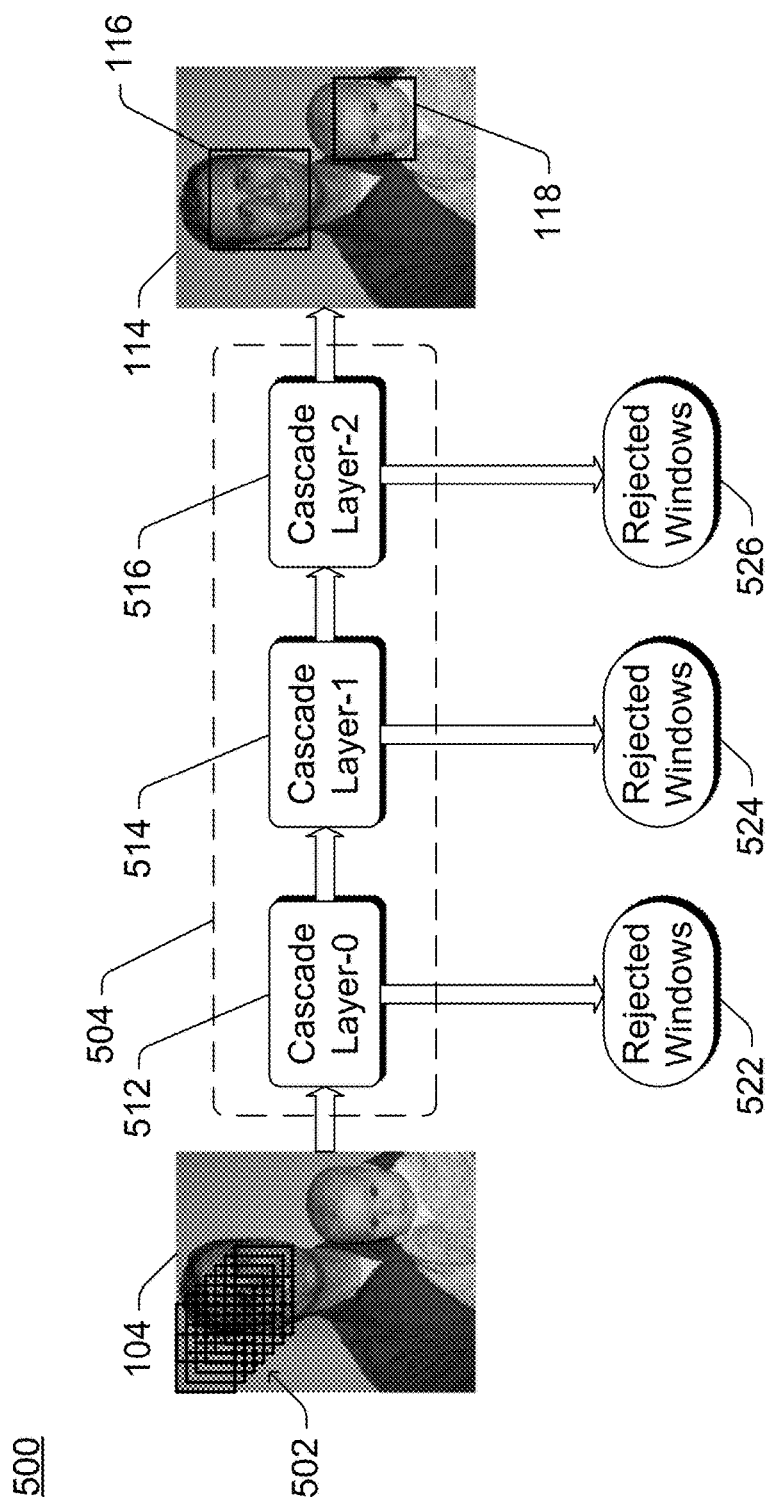
FIG. 5 illustrates an example workflow for detecting objects using cascaded convolutional neural networks in accordance with one or more embodiments.

FIG. 5 illustrates an example workflow 500 for detecting objects using cascaded convolutional neural networks in accordance with one or more embodiments. The workflow 500 includes an input image 104 and an output image 114 with rectangular boxes 116 and 118 around the identified faces. Multiple candidate windows are identified in the input image 104 (e.g., by sliding a geometric shape of different sizes around the image as discussed above with respect to act 302 FIG. 3), some of which are illustrated as rectangular candidate windows 502 in the image 104. It should be noted that only some of the candidate windows identified in the image 104 are illustrated in FIG. 5.

Ones of the candidate windows in the input image 104 that include a face are identified by the cascaded convolutional neural networks 504. The cascaded convolutional neural networks 504 include three cascaded layers, illustrated as cascade layer 512, cascade layer 514, and cascade layer 516.

All of the candidate windows identified in the input image 104 are analyzed by the cascade layer 512. The cascade layer 512 is a shallow (e.g., containing only a few layers) and small (e.g., analyzing low resolution windows, such as 8×8 pixel, 10×10 pixel, or 12×12 pixel windows) convolutional neural network. The cascade layer 512 is less computationally expensive (e.g., identifies whether a candidate window includes a face more quickly) than the other cascade layers 514 and 516. However, the cascade layer 512 is also less accurate (e.g., has a larger number of false positives, a false positive referring to a candidate window that does not include a face but that is identified as including a face) than the other cascade layers 514 and 516.

The cascade layer 512 is trained with a set of training images that include faces as well as images that do not include faces (e.g., randomly sampled background images). The training of the cascade layer 512 allows the convolutional neural network of the cascade layer 512 to learn the characteristics of windows that include a face and the characteristics of windows that do not include a face.

Ones of the candidate windows (also referred to as a set of candidate windows) that the cascade layer 512 identifies as including a face are provided to the cascade layer 514. Ones of the candidate windows (also referred to as a set of candidate windows) that the cascade layer 512 identifies as not including a face are dropped or rejected, illustrated as rejected windows 522.

Ones of the candidate windows (also referred to as a set of candidate windows) that the cascade layer 512 identifies as including a face are analyzed by the cascade layer 514. The cascade layer 514 is a shallow convolutional neural network (e.g., the same as the cascade layer 512) that is larger (e.g., analyzes windows of higher resolution, such as 16×16 pixel, 20×20 pixel, or 24×24 pixel windows) than the convolutional neural network in cascade layer 512. The cascade layer 514 is more computationally expensive (e.g., identifies whether a candidate window includes a face less quickly) than the cascade layer 514, but less computationally expensive than the cascade layer 516. Furthermore, the cascade layer 514 is more accurate (e.g., has a smaller number of false positives) than the cascade layer 512, but less accurate than the cascade layer 516.

The cascade layer 514 is trained with a set of training images that include faces as well as images that do not include faces (e.g., images that are analyzed by the cascade layer 512 (after the cascade layer 512 has been trained) and determined to include no face (no candidate windows in the images include a face)). The training of the cascade layer 514 allows the convolutional neural network of the cascade layer 514 to learn the characteristics of windows that include a face and the characteristics of windows that do not include a face.

Ones of the candidate windows (also referred to as a set of candidate windows) that the cascade layer 514 identifies as including a face are provided to the cascade layer 516. Ones of the candidate windows (also referred to as a set of candidate windows) that the cascade layer 514 identifies as not including a face are dropped or rejected, illustrated as rejected windows 524.

Ones of the candidate windows that the cascade layer 514 identifies as including a face are analyzed by the cascade layer 516. The cascade layer 516 is a deeper convolutional neural network (deeper than the convolutional neural networks in the cascade layers 512 and 514, e.g., including several layers) that is larger than the convolutional neural network in cascade layer 514 (e.g., analyzes windows of higher resolution, such as 32×32 pixel, 40×40 pixel, or 48×48 pixel windows). The cascade layer 516 is more computationally expensive than the cascade layers 512 and 514, and the cascade layer 516 is also more accurate than the cascade layers 512 and 514.

The cascade layer 516 is trained with a set of training images that include faces as well as images that do not include faces (e.g., images that are analyzed by the cascade layer 514 (after the cascade layer 514 has been trained) and determined to include no face (no candidate windows in the images include a face)). The training of the cascade layer 516 allows the convolutional neural network of the cascade layer 516 to learn the characteristics of windows that include a face and the characteristics of windows that do not include a face.

Ones of the candidate windows (also referred to as a set of candidate windows) that the cascade layer 516 identifies as including a face are indicated as being faces in the output image 114. Ones (also referred to as a set of candidate windows) of the candidate windows that the cascade layer 516 identifies as not including a face are dropped or rejected, illustrated as rejected windows 526.

Each cascade layer 512, 514, and 516 is a convolutional neural network that receives as an input a set of one or more candidate windows, and analyzes each candidate window (typically analyzing one candidate window at a time). Each candidate window can be in any of a variety of different color spaces, such as the RGB (Red, Green, Blue) color space. Each convolutional neural network is trained to identify faces in a candidate window, and generates a value indicating a confidence the convolutional neural network has that the candidate window includes a face (and optionally a value indicating a confidence the convolutional neural network has that the candidate window does not include a face). These generated one or more values can be compared to a threshold value to determine whether the convolutional neural network identifies the candidate window as including a face or not including a face. For example, if the confidence the convolutional neural network has that a candidate window includes a face satisfies (e.g., is greater than, or is equal to or great than) the threshold value, then the candidate window is identified as including a face, and if the confidence the convolutional neural network has that the candidate window includes a face does not satisfy (e.g., is less than, or is less than or equal to) the threshold value, then the candidate window is rejected.

Various different threshold values can be used, and the threshold values for different cascade layers can be the same or different. In one or more embodiments, the threshold value for the cascade layer 512 is 0.4, the threshold value for the cascade layer 514 is 0.9, and the threshold value for the cascade layer 516 is 0.98. However, it should be noted that these threshold values are examples, and other threshold values can alternatively be used.

Figure 6:
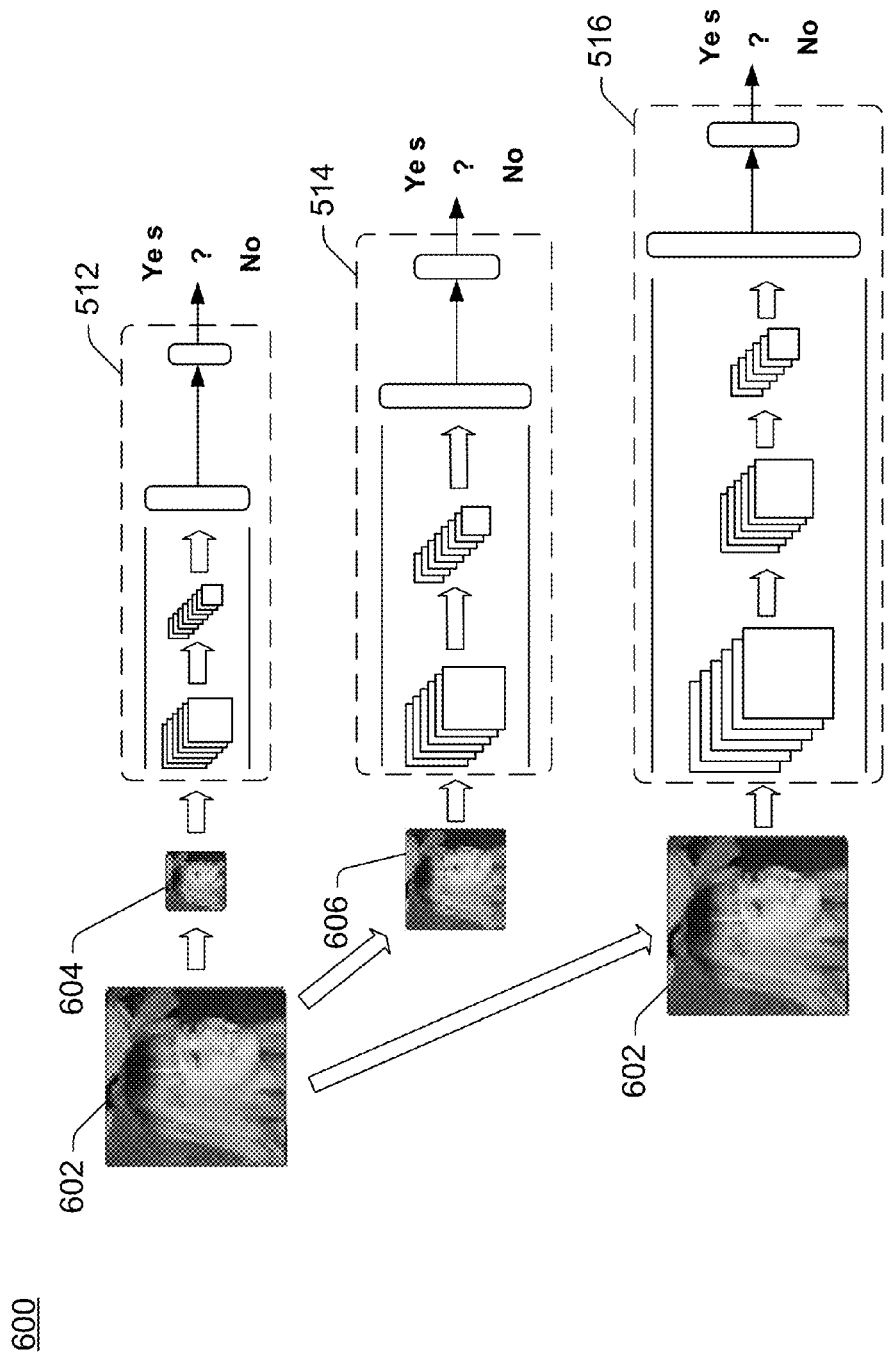
FIG. 6 illustrates an example of the cascaded convolutional neural networks in additional detail.

FIG. 6 illustrates an example 600 of the cascaded convolutional neural networks in additional detail. The example 600 can be, for example, the cascaded convolutional neural networks 504 of FIG. 5, or the convolutional neural network layers 204 of FIG. 2. The three cascade layers 512, 514, and 516 of FIG. 5 are illustrated in the example 600. A candidate window 602 is one of multiple candidate windows identified in an input image (e.g., the image 402 of FIG. 4). The resolution of the candidate window 602 is scaled as appropriate (based on the resolution of images analyzed by the cascade layer 512) to a particular scaled version 604 of the candidate window 602. The resolution of the candidate window 602 can be scaled up or down using any of a variety of public and/or proprietary techniques. In some situations, if the resolution of the candidate window 602 is the same as the resolution used by the cascade layer, the resolution of the candidate window 602 need not be scaled.

In the example 600, the candidate window 602 is 48×48 pixels, and the scaled version 604 of candidate window is 12×12 pixels, which is the size candidate window used by the cascade layer 512. The cascade layer 512 includes a 16×3×3 convolution-layer, followed by a pooling-layer (having kernel size 3, stride 2), followed by a 16 dimension fully-connected-layer.

Assuming the candidate window 604 is identified by the cascade layer 512 as including a face, the resolution of the candidate window 602 is scaled to a scaled version 606. The scaled version is 24×24 pixels, which is the size candidate window used by the cascade layer 514. The cascade layer 514 includes a 32×5×5 convolution-layer, followed by a pooling-layer (having kernel size 3, stride 2), followed by a 64 dimension fully-connected layer.

Assuming the candidate window 606 is identified by the cascade layer 514 as including a face, the resolution of the candidate window 602 is analyzed by the cascade layer 516. The size of the candidate window used by the cascade layer 516, which is 48×48 pixels, is the same as the resolution of the candidate window 602, and thus the candidate window need not be scaled. The cascade layer 516 includes a 64×5×5 convolution-layer, followed by a pooling-layer (having kernel size 3, stride 2), followed by a normalization-layer, followed by a 64×5×5 convolution-layer, followed by a normalization-layer, followed by a pooling layer (having kernel size 3, stride 2), followed by a 256 dimension fully-connected layer.

It should be noted that these parameters and configurations of the convolutional neural networks in the cascade layers of FIG. 6 are examples, and that other parameters and/or configurations can alternatively be used.

Figure 7:
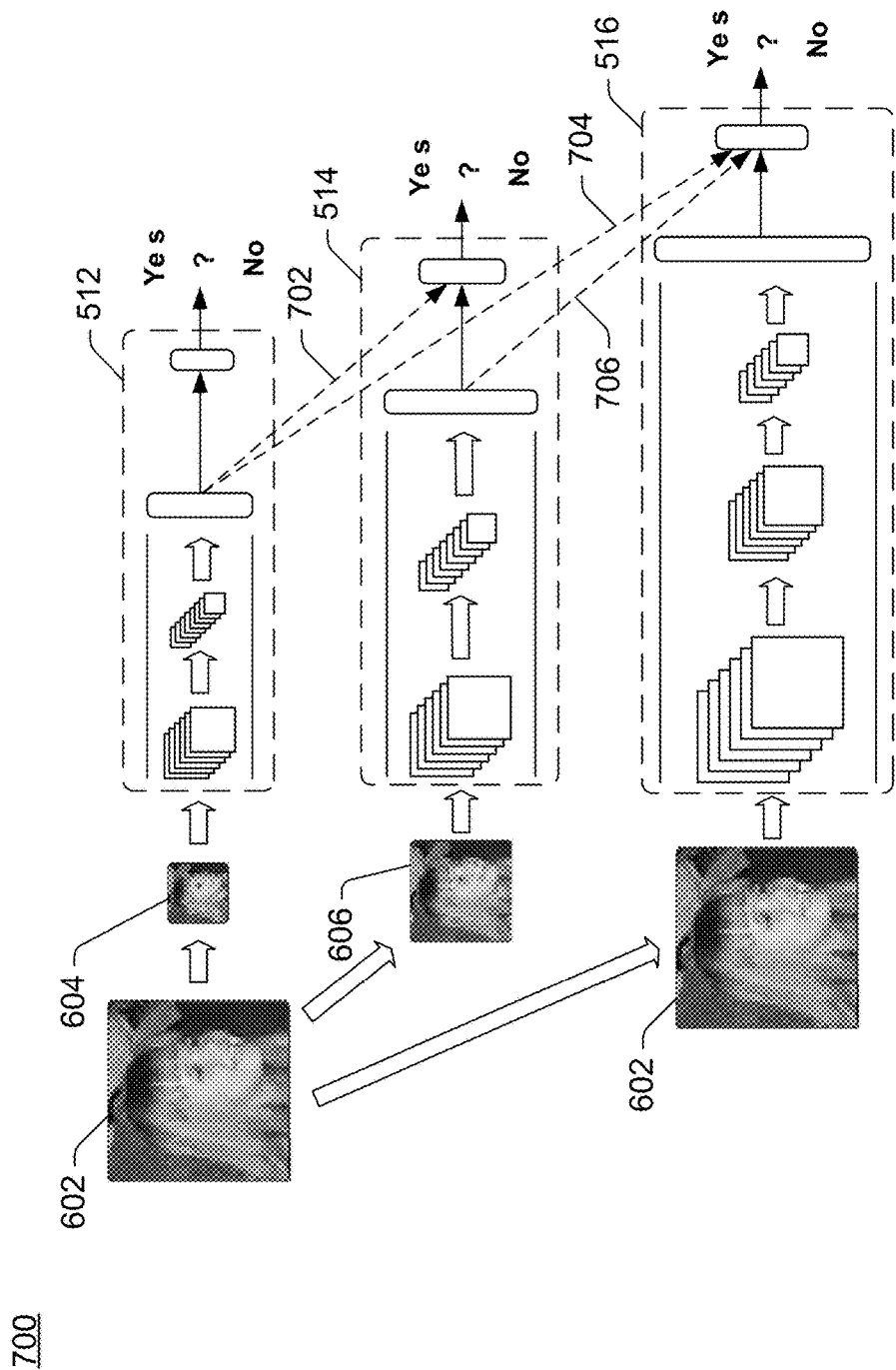
FIG. 7 illustrates another example of the cascaded convolutional neural networks in additional detail.

FIG. 7 illustrates another example 700 of the cascaded convolutional neural networks in additional detail. The example 700 is similar to the example 600, and the example 700 can be, for example, the cascaded convolutional neural networks 504 of FIG. 5, or the convolutional neural network layers 204 of FIG. 2. The example 700 illustrates the three cascade layers 512, 514, and 516, as well as the candidate window 602 and the different scaled versions 604 and 606 of the candidate window 602, as discussed above with reference to FIG. 6. The example 700 differs from the example 600 of FIG. 6, however, in that a feature of a cascade layer is used in one or more other cascade layers. In the example 700, a feature of the cascade layer 512 is used in the cascade layer 514, illustrated by dashed line 702. The feature of the cascade layer 512 is also used in the cascade layer 516, illustrated by dashed line 704. Additionally, a feature of the cascade layer 514 is used in the cascade layer 516, illustrated by dashed line 706.

Using a feature of one cascade layer (one convolutional neural network) in another cascade layer (another convolutional neural network) refers to providing a feature vector having a same dimension as the next-to-last layer in one convolutional neural network being provided to the last layer of another convolutional neural network. The dimension is the same as the number of neurons in that next-to-last layer, and for a given candidate window the feature vector includes the values of those neurons in that next-to-last layer when analyzing that candidate window. The feature vector is concatenated into the last layer of another convolutional neural network.

For example, a feature vector identifying the values of the neurons (e.g., 16) from the pooling-layer of the cascade layer 512 is concatenated into the fully-connected-layer of the cascade layer 514, and also concatenated into the fully-connected-layer of the cascade layer 516. By way of another example, a feature vector identifying the values of the neurons (e.g., 64) from the pooling-layer of the cascade layer 514 is concatenated into the fully-connected-layer of the cascade layer 516.

Using a feature of one cascade layer in another cascade layer allows information already extracted by a less accurate cascade layer to be re-used in a more accurate cascade layer. The re-use of this feature can reduce the number of neurons used to train the more accurate cascade layer, reducing the complexity and depth of the convolutional neural network of the more accurate cascade layer.

It should be noted that the features that are re-used can be re-used only for the candidate windows that are identified by the cascade layer as including a face. If the candidate window is rejected, then the candidate window is not further analyzed by another cascade layer and there is no re-use of a feature. For example, for any given candidate window, the feature of the cascade layer 512 generated for that candidate window is used by the cascade layer 514 only if that window is identified by the cascade layer 512 as including a face, and the feature of the cascade layer 512 generated for that candidate window is used by the cascade layer 516 only if that window is identified by both the cascade layer 512 and the cascade layer 514 as including a face.

Returning to FIG. 3, in one or more embodiments a window alignment neural network layer is used in act 308. The window alignment neural network shifts or transforms candidate windows that identify part of a face by various amounts to better identify a face. This shifting or transforming can also result in two candidate windows being the same candidate window (having the same location) or substantially the same candidate window (having substantially the same location), allowing one of these candidate windows to be deleted (if the candidate windows are the same or substantially the same, there is no need to analyze both candidate windows) and the number of candidate windows to be reduced.

Figure 8:
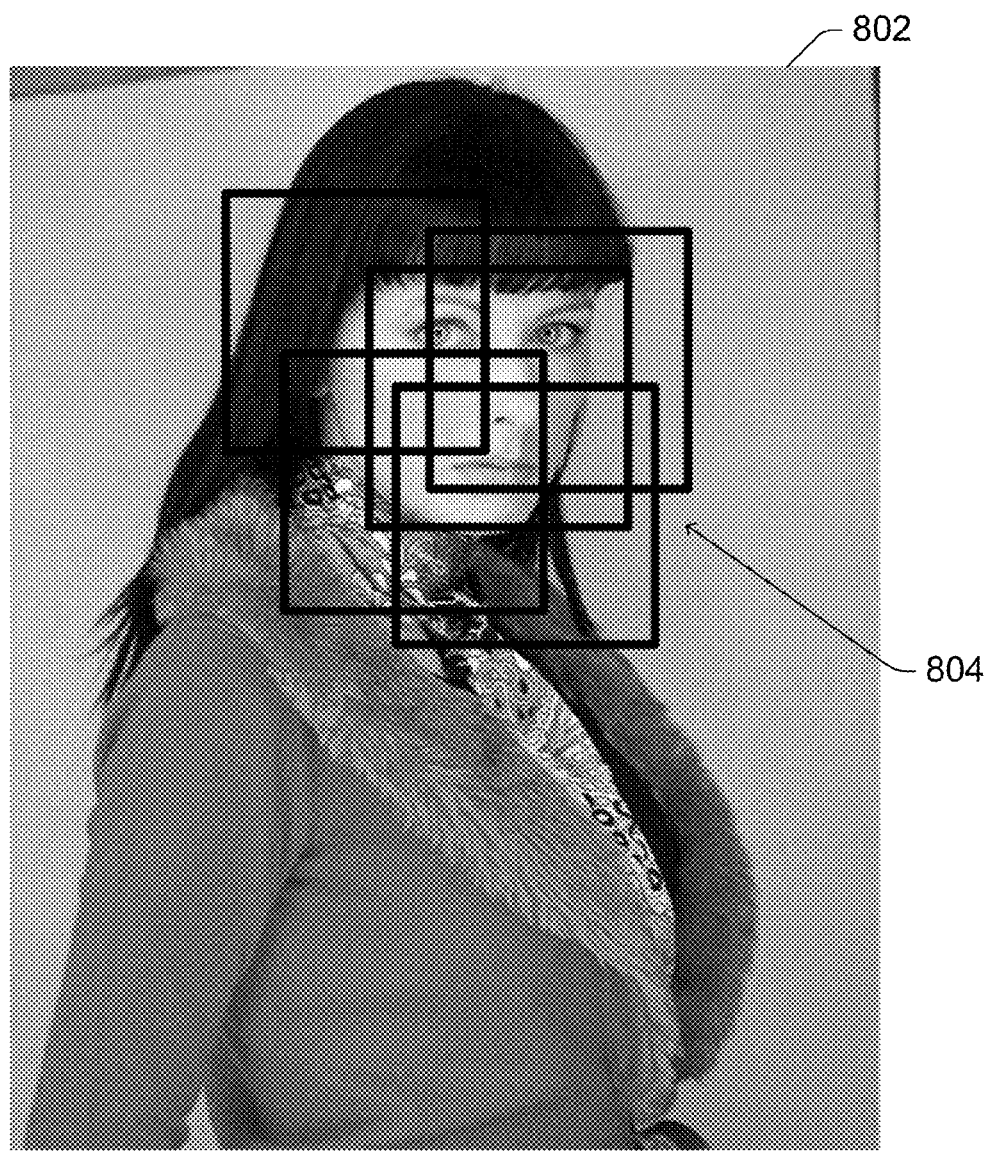
FIG. 8 illustrates an example of the use of a window alignment neural network in accordance with one or more embodiments.

FIG. 8 illustrates an example of the use of the window alignment neural network in accordance with one or more embodiments. An image 802 is illustrated and multiple candidate windows 804 have been identified. Each of these candidate windows, shown as a rectangle on the image 802, identifies a portion of the same face. These candidate windows 804, however, identify different portions, and the window alignment neural network layer facilitates shifting or transforming these candidate windows so that at least one candidate window more accurately identifies the entirety of the face.

Figure 9:
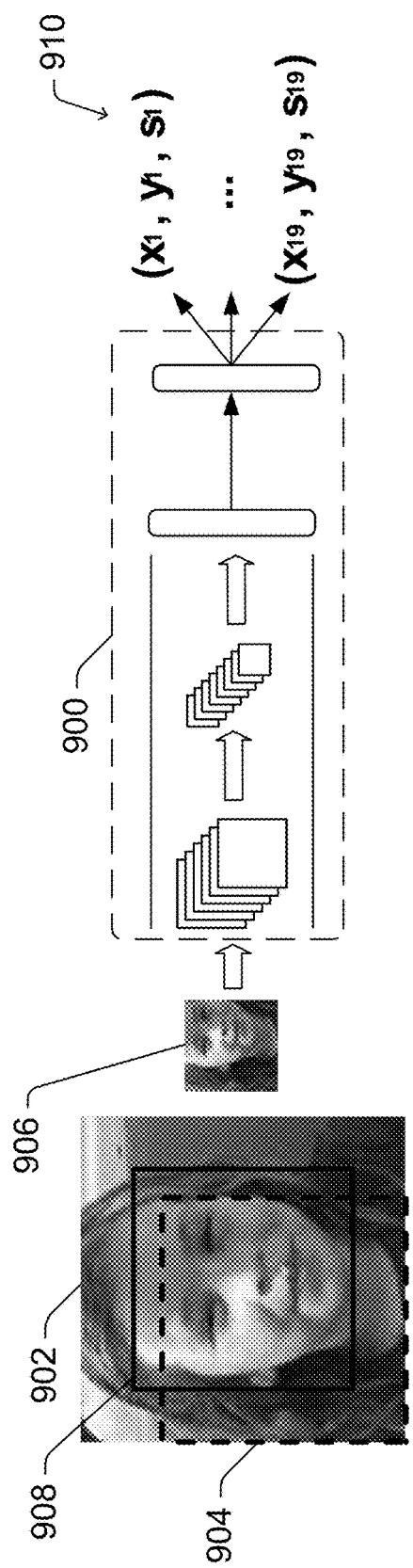
FIG. 9 illustrates an example window alignment neural network layer in accordance with one or more embodiments.

FIG. 9 illustrates an example window alignment neural network layer 900 in accordance with one or more embodiments. The window alignment neural network layer 900 can be situated between any two cascade layers of the cascaded convolutional neural networks discussed herein. A portion 902 of an image including a candidate window 904 (illustrated with a dashed line) is shown. The resolution of the candidate window 904 is scaled as appropriate to a particular scaled version 906 of the candidate window 904. The resolution of the candidate window 904 can be scaled up or down using any of a variety of public and/or proprietary techniques (or may not be scaled if the resolution of the candidate window 904 is the same as the resolution used by the window alignment neural network layer 900).

In one or more embodiments, the scaled version 906 is 24×24 pixels, which is the size candidate window used by window alignment neural network layer 900. The window alignment neural network layer 900 can include, for example, a 32×5×5 convolution-layer, followed by a pooling-layer (having kernel size 3, stride 2), followed by a 64 dimension fully-connected layer, followed by a 19 dimension soft-max output. It should be noted that these parameters and configuration of the window alignment neural network layer 900 are examples, and that other parameters and/or configurations can alternatively be used.

The window alignment neural network layer 900 is trained to position a candidate window to more accurately identify a full face in an image rather than just a portion of a face. By more accurately identifying a full face in an image, the confidence that a candidate window identifies a face, as determined by a cascade layer of the cascaded convolutional neural networks, is increased. For example, the window alignment neural network layer 900 is trained to re-position the candidate window 904 as a candidate window 908. As can be readily seen from FIG. 9, the candidate window 908 more accurately identifies the full face in the portion 902 than does the candidate window 904. The window alignment neural network layer 900 results in candidate windows around a face (e.g., identifying part of a face) converging towards identifying a full face.

In one or more embodiments, the window alignment neural network layer 900 generates an output 910 that includes a translation and a scale. The translation (illustrated as "x,y" coordinates) indicates a number of pixels to move or shift the candidate window in one or more dimensions. For example, a translation value of −3,4 indicates to move the candidate window three pixels to the left (in the x dimension) and four pixels up (in the y dimension). The scale (illustrated as an "s" value) indicates an amount to scale the translation value. This scale is an amount to increase or decrease the size of the candidate window. For example, a scale value of 1.2 indicates to increase the size of the candidate window by 20%.

The window alignment neural network layer 900 is trained using a sampling of multiple (e.g., 19) different translation and scale changes. Given this training, the window alignment neural network layer 900 generates an output 910 that identifies one of the multiple (e.g., 19) different possible translations and one of the multiple (e.g., 19) different possible scales.

Figure 10:
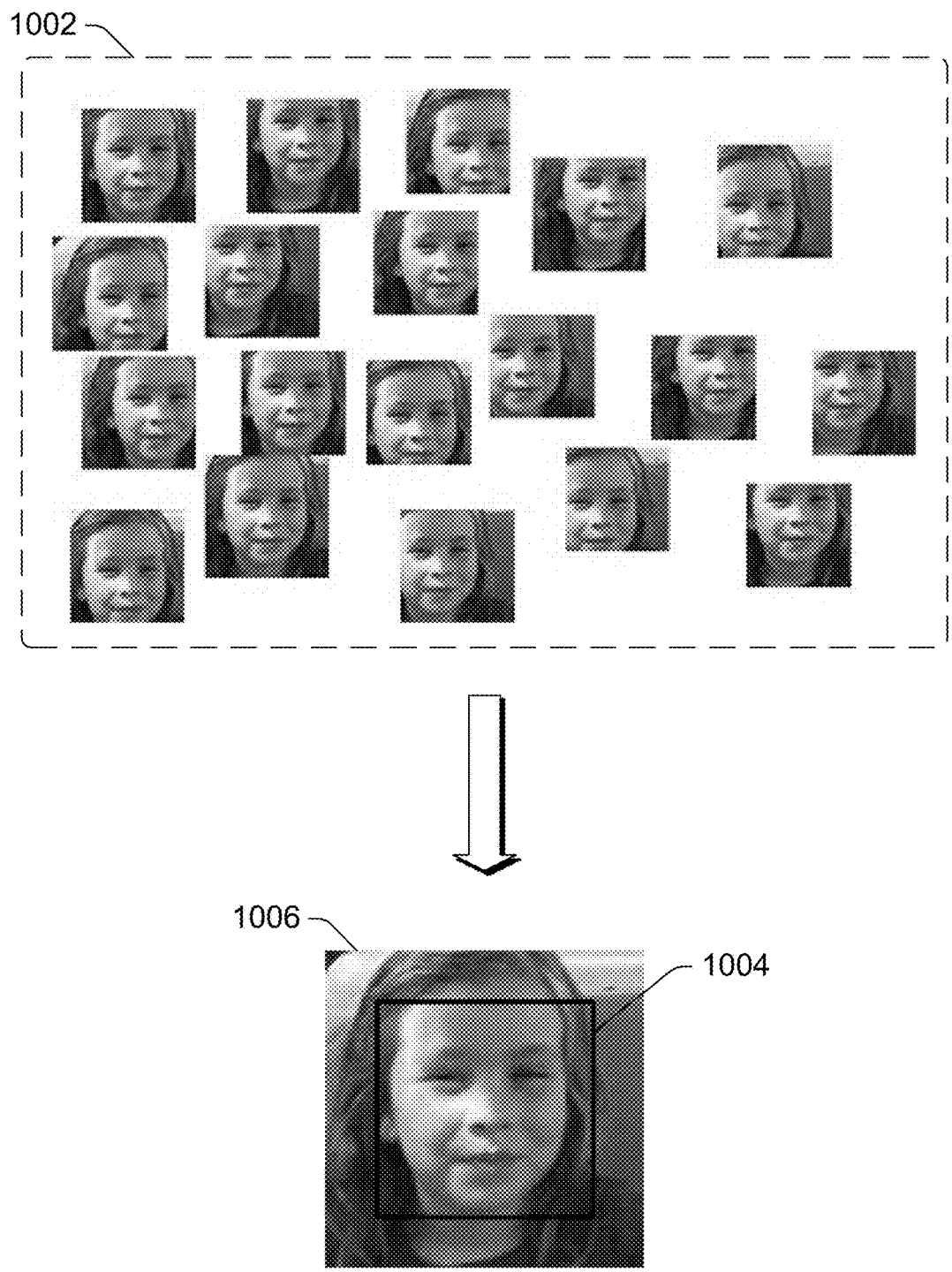
FIG. 10 illustrates an example of training of the window alignment neural network layer in accordance with one or more embodiments.

FIG. 10 illustrates an example of training of the window alignment neural network layer in accordance with one or more embodiments. A set 1002 of multiple (19) different translation and scale changes are used as a set of training images for the window alignment neural network layer. The window alignment neural network layer is trained to generate an output that translates and scales to identify a full face 1004 in an image (or portion of an image) 1006.

Returning to FIG. 9, in the discussions herein, reference is made to the window alignment neural network layer 900 generating translation and scale values. Alternatively, the window alignment neural network layer 900 can be trained to position a candidate window to more accurately identify a full face in an image in other manners. For example, the window alignment neural network layer 900 can be trained to identify one or more face landmarks, and the candidate window can be adjusted to include those one or more face landmarks. Various different face landmarks can be used, such as eyes, ears, nose, mouth, and so forth. E.g., the candidate window can be increased in size, decreased in size, shifted or translated, and so forth. The adjustment can be performed in various manners based on the one or more face landmarks, such as an adjustment so that the candidate window includes all of the face landmarks, an adjustment so that the candidate window includes an area beyond a face landmark (e.g., a particular number of pixels above the eyes), and so forth.

Figure 11:
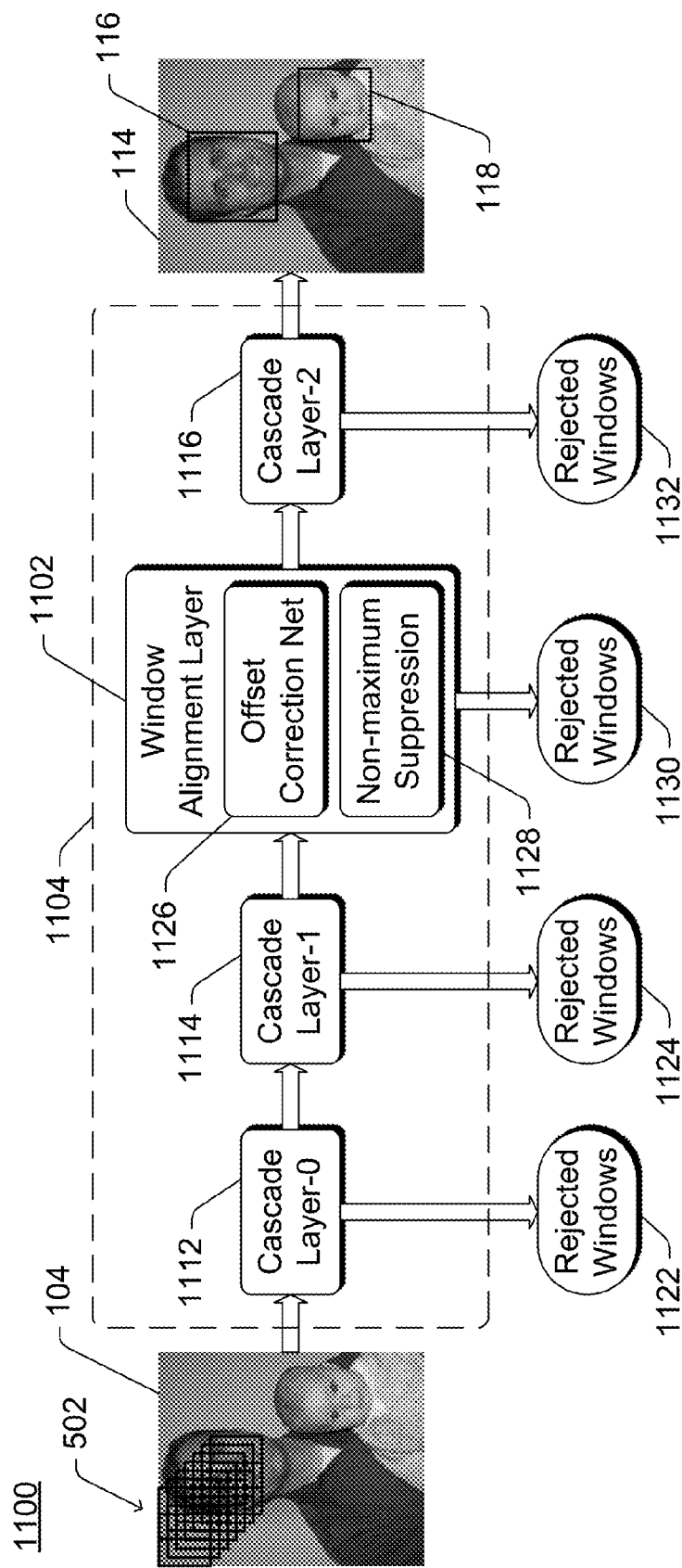
FIG. 11 illustrates another example workflow for detecting objects using cascaded convolutional neural networks in accordance with one or more embodiments.

FIG. 11 illustrates an example workflow 1100 for detecting objects using cascaded convolutional neural networks in accordance with one or more embodiments. The workflow 1100 is similar to the workflow 500 of FIG. 5 discussed above, however the workflow 1100 includes a window alignment layer 1102. Analogous to the discussion regarding the workflow 500, the workflow 1100 includes an input image 104 with candidate windows 502, and an output image 114 with rectangular boxes 116 and 118 around the identified faces.

Ones of the candidate windows in the input image 104 that include a face are identified by the cascaded convolutional neural networks object detection system 1104. The object detection system includes three cascaded layers, illustrated as cascade layer 1112, cascade layer 1114, and cascade layer 1116, and the window alignment layer 1102. The cascade layer 1112 is the cascade layer 512 discussed above, and the cascade layer 1114 is the cascade layer 514 discussed above. The cascade layer 1116 can be the cascade layer 516 discussed above, although analyzes candidate windows after the analysis is performed by the window alignment layer 1102.

All of the candidate windows identified in the input image 104 are analyzed by the cascade layer 1112. Ones of the candidate windows that the cascade layer 1112 identifies as including a face are provided to the cascade layer 1114. Ones of the candidate windows that the cascade layer 1112 identifies as not including a face are dropped or rejected, illustrated as rejected windows 1122.

Ones of the candidate windows that the cascade layer 1112 identifies as including a face are analyzed by the cascade layer 1114. Ones of the candidate windows that the cascade layer 1114 identifies as including a face are provided to the window alignment layer 1102. Ones of the candidate windows that the cascade layer 1114 identifies as not including a face are dropped or rejected, illustrated as rejected windows 1124.

Ones of the candidate windows that the cascade layer 1114 identifies as including a face are analyzed by the window alignment layer 1102. The window alignment layer 1102 includes an offset correction neural network 1126 and a non-maximum suppression module 1128. The offset correction neural network 1126 is (or includes) a window alignment neural network layer, such as the window alignment neural network layer 900 of FIG. 9. The window alignment layer 1102 (or the offset correction net 1126) re-positions the candidate windows based on the output generated by the window alignment neural network layer (e.g., translating and scaling the candidate windows as indicated by the window alignment neural network layer). The offset correction neural network 1126 re-positions a candidate window to more accurately identify a full face in an image in other manners as discussed above. Thus, each of the candidate windows that the cascade layer 1114 identifies as including a face can be re-positioned by the window alignment layer 1102.

The non-maximum suppression module 1128 identifies two candidate windows, after being positioned by the offset correction neural network 1126, that are the same or substantially the same. Two candidate windows are the same if their locations on the image are the same (e.g., one or both candidate windows are adjusted by the offset correction neural network 1126 so that they identify the same pixels of the image). Two candidate windows are substantially the same if their locations on the image are substantially the same (e.g., one or both candidate windows are adjusted by the offset correction neural network 1126 so that the pixels of the image that they identify are substantially the same, such as greater than a particular threshold number of pixels (e.g., at least 98% of the pixels are the same)). For any two candidate windows that are the same or substantially the same, the non-maximum suppression module 1128 drops or rejects one of the two candidate windows, illustrated as rejected windows 1130. Which of the two candidate windows is dropped or rejected can be determined in various manners, such as randomly, pseudo randomly, or according to various other rules or criteria.

The ones of the candidate windows that the cascade layer 1114 identifies as including a face, as re-positioned by the window alignment layer 1102 and excluding any candidate windows dropped or rejected by the window alignment layer 1102, are analyzed by the cascade layer 1116. Ones of the candidate windows that the cascade layer 1116 identifies as including a face are indicated as being faces in the output image 114. Ones of the candidate windows that the cascade layer 1116 identifies as not including a face are dropped or rejected, illustrated as rejected windows 1132.

Figure 12:
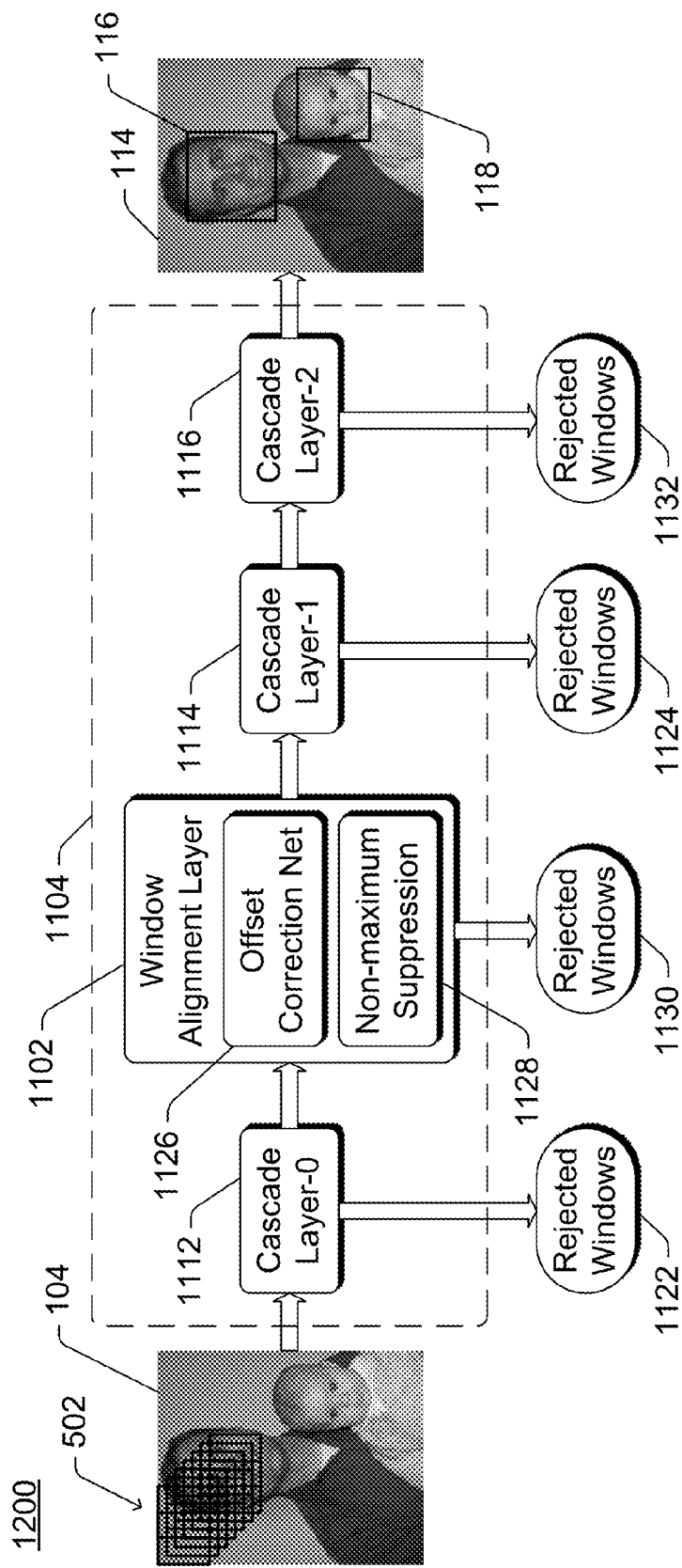
FIG. 12 illustrates another example workflow for detecting objects using cascaded convolutional neural networks in accordance with one or more embodiments.

FIG. 12 illustrates an example workflow 1200 for detecting objects using cascaded convolutional neural networks in accordance with one or more embodiments. The workflow 1200 is analogous to the workflow 1100 of FIG. 11 discussed above, except that the workflow 1200 includes the window alignment layer 1102 positioned between cascade layer 1112 and cascade layer 1114. Thus, ones of the candidate windows that the cascade layer 1112 identifies as including a face are analyzed by the window alignment layer 1102. The ones of the candidate windows that the cascade layer 1112 identifies as including a face, as re-positioned by the window alignment layer 1102 and excluding any candidate windows dropped or rejected by the window alignment layer 1102, are analyzed by the cascade layer 1114. Ones of the candidate windows that the cascade layer 1114 identifies as including a face are analyzed by the cascade layer 1116. Ones of the candidate windows that the cascade layer 1116 identifies as including a face are indicated as being faces in the output image 114.

It should be noted that in the workflow 1100 of FIG. 11 and/or the workflow 1200 of FIG. 12, a feature of a cascade layer can be used in one or more other cascade layers as discussed above regarding FIG. 7. For example, a feature of the cascade layer 1112 can be used in the cascade layer 1114 and the cascade layer 1116. By way of another example, a feature of the cascade layer 1114 can be used in the cascade layer 1116.

In some of the discussions herein, reference is made to the cascaded convolutional neural networks including three cascade layers. The cascade layers are hierarchical in nature, with each cascade layer (except for the first cascade layer) analyzing candidate windows already identified as including a face by another cascade layer (referred to as a previous or earlier cascade layer), and the candidate windows identified by each cascade layer (except for the last cascade layer) as including a face being further analyzed by another cascade layer (referred to as a subsequent or later cascade layer). It should be noted that the use of three cascade layers is an example, and the cascaded convolutional neural networks can be implemented using more than three cascade layers. Such additional cascade layers can be situated before any of the cascade layers and/or after any of the cascade layers (e.g., between any two of the three cascade layers). For example, the cascaded convolutional neural network may include four or five cascade layers. In one or more embodiments, any such additional cascade layer is more computationally expensive than any earlier cascade layer, but less computationally expensive than any later cascade layer. Similarly, any such additional cascade layer is more accurate than any earlier cascade layer, but less accurate than any later cascade layer.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 13:
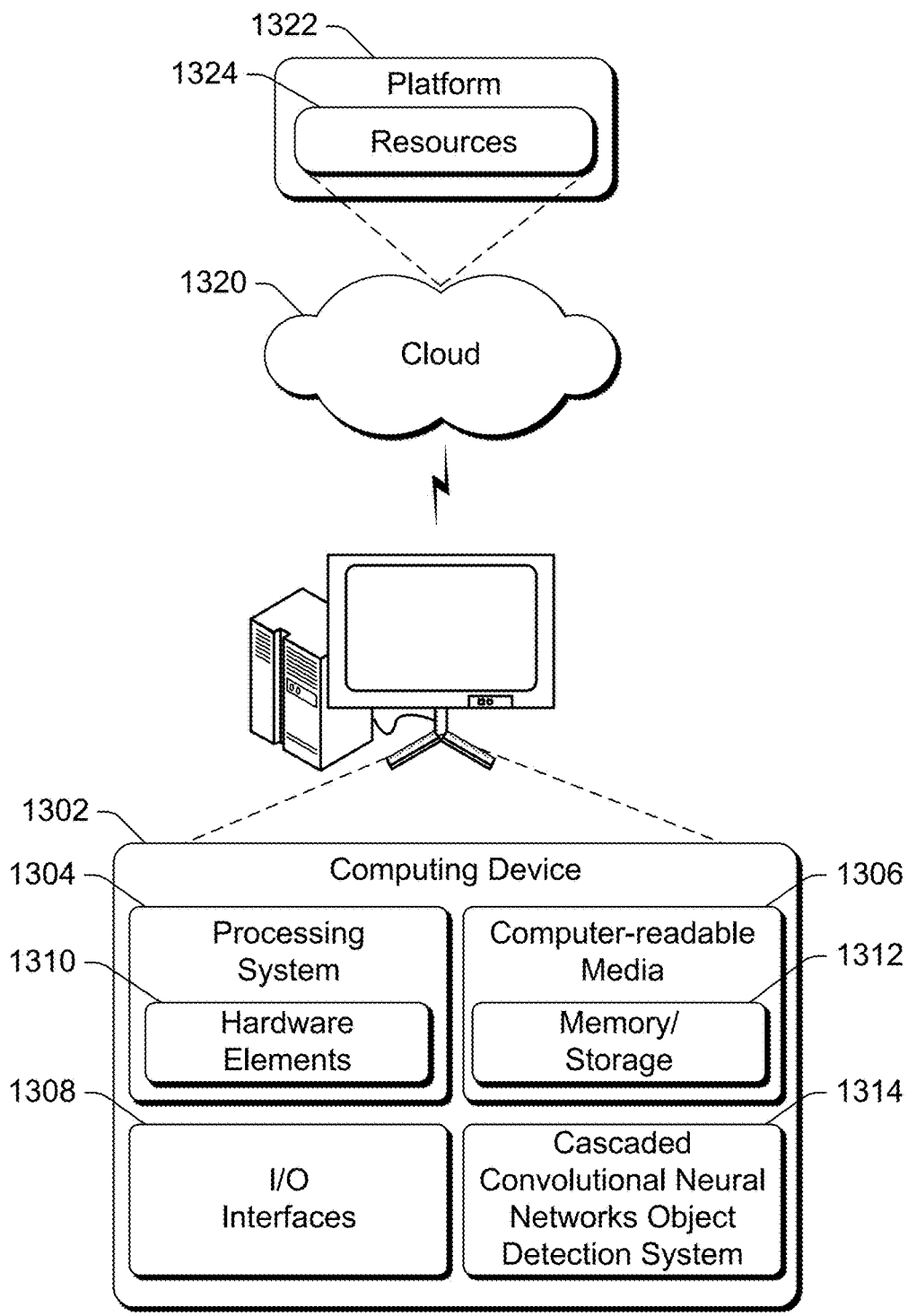
FIG. 13 illustrates an example system that includes an example computing device that is representative of one or more computing systems and/or devices that may implement the various techniques described herein.

FIG. 13 illustrates an example system generally at 1300 that includes an example computing device 1302 that is representative of one or more computing systems and/or devices that may implement the various techniques described herein. This is illustrated through inclusion of the cascaded convolutional neural network object detection system 1314, which may be configured to detect faces or other objects in images as discussed above. Computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interfaces 1308 that are communicatively coupled, one to another. Although not shown, computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 1304 is representative of functionality to perform one or more operations using hardware. Accordingly, processing system 1304 is illustrated as including hardware elements 1310 that may be configured as processors, functional blocks, and so forth. This may include implementation in hardware as an application specific integrated circuit or other logic device formed using one or more semiconductors. Hardware elements 1310 are not limited by the materials from which they are formed or the processing mechanisms employed therein. For example, processors may be comprised of semiconductor(s) and/or transistors (e.g., electronic integrated circuits (ICES)). In such a context, processor-executable instructions may be electronically-executable instructions.

Computer-readable storage media 1306 is illustrated as including memory/storage 1312. Memory/storage 1312 represents memory/storage capacity associated with one or more computer-readable media. Memory/storage component 1312 may include volatile media (such as random access memory (RAM)) and/or nonvolatile media (such as read only memory (ROM), Flash memory, optical disks, magnetic disks, and so forth). Memory/storage component 1312 may include fixed media (e.g., RAM, ROM, a fixed hard drive, and so on) as well as removable media (e.g., Flash memory, a removable hard drive, an optical disc, and so forth). Computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 1302. By way of example, and not limitation, computer-readable media may include "computer-readable storage media" and "computer-readable signal media."

"Computer-readable storage media" refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. Computing device 1302 may be configured to implement particular instructions and/or functions corresponding to the software and/or hardware modules. Accordingly, implementation of a module that is executable by computing device 1302 as software may be achieved at least partially in hardware, e.g., through use of computer-readable storage media and/or hardware elements 1310 of processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of computing device 1302 and are not limited to the specific examples of the techniques described herein. This functionality may also be implemented all or in part through use of a distributed system, such as over a "cloud" 1320 via a platform 1322 as described below.

Cloud 1320 includes and/or is representative of a platform 1322 for resources 1324. Platform 1322 abstracts underlying functionality of hardware (e.g., servers) and software resources of cloud 1320. Resources 1324 may include applications and/or data that can be utilized while computer processing is executed on servers that are remote from computing device 1302. Resources 1324 can also include services provided over the Internet and/or through a subscriber network, such as a cellular or Wi-Fi network.

Platform 1322 may abstract resources and functions to connect computing device 1302 with other computing devices. Platform 1322 may also serve to abstract scaling of resources to provide a corresponding level of scale to encountered demand for resources 1324 that are implemented via platform 1322. Accordingly, in an interconnected device embodiment, implementation of functionality described herein may be distributed throughout system 1300. For example, the functionality may be implemented in part on computing device 1302 as well as via platform 1322 that abstracts the functionality of the cloud 1320.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
  identifying multiple candidate windows in an image, each candidate window including a group of pixels of the image, the multiple candidate windows including overlapping candidate windows;
  identifying one or more of the multiple candidate windows that include an object, the identifying including analyzing the multiple candidate windows using cascaded convolutional neural networks, the cascaded convolutional neural networks including multiple cascade layers, each cascade layer comprising a convolutional neural network, the multiple cascade layers including a first cascade layer that analyzes the identified multiple candidate windows, a second cascade layer that analyzes ones of the multiple candidate windows identified by the first cascade layer as including an object, and a third cascade layer that analyzes ones of the multiple candidate windows identified by the second cascade layer as including an object; and outputting, as an indication of one or more objects in the image, an indication of one or more of the multiple candidate windows identified by the third cascade layer as including an object.

2. A method as recited in claim 1, the object comprising a face.

3. A method as recited in claim 1, the cascaded convolutional neural networks further including one or more additional cascade layers situated between the first cascade layer and the third cascade layer.

4. A method as recited in claim 1, further comprising:
re-using, for one of the multiple candidate windows identified by the first cascade layer as including an object, a feature of the first cascade layer in the second cascade layer; and
re-using, for one of the multiple candidate windows identified by both the first cascade layer and the second cascade layer as including an object, a feature of the first cascade layer in the third cascade layer.

5. A method as recited in claim 4, further comprising re-using, for one of the multiple candidate windows identified by the second cascade layer as including an object, a feature of the second cascade layer in the third cascade layer.

6. A method as recited in claim 1, the object comprising a face, and the method further comprising using a window alignment neural network layer, situated between two cascade layers of the multiple cascade layers, to re-position one of the multiple candidate windows to more accurately identify a full face rather than just a portion of a face.

7. A method as recited in claim 6, the window alignment neural network layer generating both a translation value and a scale value for the one of the multiple candidate windows, and the using the window alignment neural network layer to re-position the one of the multiple candidate windows including moving the one of the multiple candidate windows in accordance with the translation value and scaling the one of the multiple candidate windows in accordance with the scale value.

8. A method as recited in claim 7, further comprising:
re-using, for one of the multiple candidate windows identified by the first cascade layer as including an object, a feature of the first cascade layer in the second cascade layer; and
re-using, for one of the multiple candidate windows identified by both the first cascade layer and the second cascade layer as including an object, a feature of the first cascade layer in the third cascade layer.

9. A method as recited in claim 6, the window alignment neural network layer being situated between the first cascade layer and the second cascade layer.

10. A method as recited in claim 6, the window alignment neural network layer being situated between the second cascade layer and the third cascade layer.

11. A cascaded convolutional neural networks object detection system comprising:
an image access module configured to obtain an image;
a first cascade layer comprising a first convolutional neural network, the first cascade layer configured to analyze multiple candidate windows identified in the image to identify a first set of the multiple candidate windows that include an object, each candidate window including a group of pixels of the image, the multiple candidate windows including overlapping candidate windows;
a second cascade layer comprising a second convolutional neural network, the second cascade layer configured to analyze the first set of the multiple candidate windows to identify a second set of the multiple candidate windows that include an object;
a third cascade layer comprising a third convolutional neural network, the third cascade layer configured to analyze the second set of the multiple candidate windows to identify a third set of the multiple candidate windows that include an object; and
an output module configured to output, for each candidate window of the third set of the multiple candidate windows, an indication of the object included in the candidate window.

12. A system as recited in claim 11, the output module being further configured to output the indication of the identified object by displaying on the image a rectangular shape around the object.

13. A system as recited in claim 11, further comprising:
the second cascade layer being further configured to re-use, for one of the multiple candidate windows identified by the first cascade layer as including an object, a feature of the first cascade layer; and
the third cascade layer being further configured to re-use, for one of the multiple candidate windows identified by both the first cascade layer and the second cascade layer as including an object, a feature of the first cascade layer.

14. A system as recited in claim 13, the third cascade layer being further configured to re-use, for one of the multiple candidate windows identified by the second cascade layer as including an object, a feature of the second cascade layer.

15. A system as recited in claim 11, the object comprising a face, and the system further comprising a window alignment neural network layer, situated between two cascade layers of the multiple cascade layers, configured to re-position one of the multiple candidate windows to more accurately identify a full face rather than just a portion of a face.

16. A system as recited in claim 15, the window alignment neural network layer being configured to generate both a translation value and a scale value for the one of the multiple candidate windows, and to re-position the one of the multiple candidate windows by moving the one of the multiple candidate windows in accordance with the translation value and scaling the one of the multiple candidate windows in accordance with the scale value.

17. A computing device comprising:
one or more processors; and
one or more computer-readable storage media having stored thereon multiple instructions that, when executed by the one or more processors, cause the one or more processors to perform acts comprising:
identifying multiple candidate windows in an image, each candidate window including a group of pixels of the image, the multiple candidate windows including overlapping candidate windows;
identifying one or more of the multiple candidate windows that include an object, the identifying including analyzing the multiple candidate windows using cascaded convolutional neural networks, the cascaded convolutional neural networks including multiple cascade layers, each cascade layer comprising a convolutional neural network, the multiple cascade layers including a first cascade layer that analyzes the identified multiple candidate windows, a second cascade layer that analyzes ones of the multiple candidate windows identified by the first cascade layer as including an object, and a third cascade layer that analyzes ones of the multiple candidate windows identified by the second cascade layer as including an object; and outputting, as an indication of one or more objects in the image, an indication of one or more of the multiple candidate windows identified by the third cascade layer as including an object.

18. A computing device as recited in claim 17, the object comprising a face, and the acts further comprising using a window alignment neural network layer, situated between two cascade layers of the multiple cascade layers, to re-position one of the multiple candidate windows to more accurately identify a full face rather than just a portion of a face.

19. A computing device as recited in claim 18, the window alignment neural network layer generating both a translation value and a scale value for the one of the multiple candidate windows, and the using the window alignment neural network layer to re-position the one of the multiple candidate windows including moving the one of the multiple candidate windows in accordance with the translation value and scaling the one of the multiple candidate windows in accordance with the scale value.

20. A computing device as recited in claim 17, the object comprising a face, the acts further comprising:
   re-using, for one of the multiple candidate windows identified by the first cascade layer as including a face, a feature of the first cascade layer in the second cascade layer; and
   re-using, for one of the multiple candidate windows identified by both the first cascade layer and the second cascade layer as including a face, a feature of the first cascade layer in the third cascade layer.

* * * * *